United States Patent
Olson et al.

[15] 3,689,578
[45] Sept. 5, 1972

[54] PROCESS FOR THE PRODUCTION OF VINYLICALLY CHLORINATED OLEFINS

[72] Inventors: Danford H. Olson; George M. Bailey, both of Littleton, Colo.

[73] Assignee: Marathon Oil Company, Findlay, Ohio

[22] Filed: Oct. 7, 1969

[21] Appl. No.: 870,949

Related U.S. Application Data

[62] Division of Ser. No. 499,041, Oct. 20, 1965, Pat. No. 3,501,539.

[52] U.S. Cl..........260/654 R, 260/656 R, 260/659 R
[51] Int. Cl................................................C07c 21/00
[58] Field of Search.....................260/656 R, 654 R, 260/659A, 654A 260/662 A, 659 R

[56] References Cited
UNITED STATES PATENTS

| | | | |
|---|---|---|---|
| 2,407,828 | 9/1946 | Gorin | 260/659 |
| 2,167,927 | 8/1939 | Groll et al. | 260/656 |

FOREIGN PATENTS OR APPLICATIONS

| | | | |
|---|---|---|---|
| 705,925 | 3/1965 | Canada | 260/659 |
| 536,810 | 2/1957 | Canada | 260/656 |
| 907,435 | 10/1962 | Great Britain | 260/659 |

*Primary Examiner*—Leon Zitver
*Assistant Examiner*—A. Siegel
*Attorney*—Sughrue, Rothwell, Mion, Zinn & Macpeak

[57] ABSTRACT

A process for producing tetrachloroethylene comprising passing a gas stream of ethylene over a catalyst composition of cupric chloride and an inert material at a temperature in the range of 400 to 525° C. and at a flow rate of less than 5 cc of gas stream per minute per gram of cupric chloride.

6 Claims, No Drawings

PROCESS FOR THE PRODUCTION OF VINYLICALLY CHLORINATED OLEFINS

This application is a division of Ser. No. 499,041 filed on 10/20/65 and now U.S. Pat. No. 3,501,539.

This invention relates to the production of vinylically chlorinated olefins. More particularly the invention relates to the production of vinyl chloride, tetrachloroethylene, and other chlorinated olefins by the reaction of an olefinically unsaturated hydrocarbon in the gas phase with cupric chloride.

Although vinyl chloride is an extremely valuable chemical intermediate, all of the presently known methods for its production contain certain disadvantages. One method for producing vinyl chloride is by the addition reaction of hydrogen chloride and acetylene. Since acetylene is expensive and potentially explosive, if improperly handled, its use in the production of vinyl chloride is undesirable. The cracking of 1,2-dichloroethane has been extensively used to produce vinyl chloride. The major disadvantage of this cracking process is the necessity of producing 1,2-dichloroethane as an intermediate which adds a costly step to the process. A further process for producing vinyl chloride involves the reaction of ethylene with chlorine gas. As extreme hazards attend the mixing of reactive chlorine gas with organic material, this process has not gained commercial acceptance.

In still another method, ethylene is reacted with hydrogen chloride and oxygen in the presence of cupric chloride and other salts, but this latter process requires more severe conditions and is not applicable to produce the wide range of products of the present invention.

Accordingly, it is an object of this invention to provide a process for preparing vinylically chlorinated olefins, selectively and in good yields, from inexpensive, readily available, and easily handled raw materials.

It is another object of the invention to provide a process for preparing vinyl chloride, selectively and in good yield by the reaction of ethylene with cupric chloride under carefully controlled conditions of temperature and contact times.

It is a further object of the invention to provide a process for the preparation of tetrachloroethylene selectively, and in good yield by a variation of the method employed for the preparation of vinyl chloride.

The manner in which the foregoing and other objects are achieved will become apparent from the following detailed description of the best mode which has been contemplated for carrying out the invention.

The reaction of ethylene and cupric chloride is not new. However, prior reactions of these materials were conducted at relatively low temperatures with the products consisting essentially only of 1,2-dichloroethane. In fact the reaction has been reported to give yield of 1,2-dichloroethane as high as from 95 to 99 percent of the theoretical.

It has new been discovered after extensive study of the relationship of products and yields to the ranges of temperatures and contact times employed in the reaction of ethylene and cupric chloride, that by conducting the reaction under certain conditions, selectivity and high yields of vinylically chlorinated olefin products can be realized.

In particular, it has now been found that by reacting ethylene with a cupric chloride catalyst at a temperature in the range of from 400° to 550° C and at a flow rate of from 1 to 44cc of gas per minute per gram of cupric chloride, substantial amounts of vinyl chloride, and/or tetrachloroethylene can be produced. In addition to vinyl chloride, and tetrachloroethylene the reaction produces other chlorinated hydrocarbons including di-, tri-, and tetrachlorinated ethanes and ethylenes. The vinyl chloride or tetrachloroethylene can easily be separated and recovered from the other chlorination products by methods well known to the art.

The remaining chlorinated hydrocarbons can then either be cracked to produce further amounts of vinyl chloride or recycled for further reaction with the cupric chloride catalyst to produce substantial amounts of tetrachloroethylene.

Anhydrous cupric chloride ($CuCl_2$) is employed as the catalyst. It is preferably used in the form of a mixture with an inert material such as carborundum or asbestos, which functions to disperse the catalyst. The inert material used is not important so long as it is inert under the reaction conditions. The weight ratio of inert material to cupric chloride catalyst is also not critical. The preferred range, however, is from about 1:1 to about 3:1 parts by weight of inert material to cupric chloride.

In a preferred embodiment of the invention, ethylene is used as the feed material. When ethylene is employed, substantial amounts of vinyl chloride are obtained by passing the ethylene gas over the mixture of anhydrous cupric chloride and inert material at a temperature of from 400° to 550° C. at a flow rate of from 1 to 40cc of ethylene per minute per gram of cupric chloride. Preferably, a temperature of from 450° to 550° C. and a flow rate from 12 to 42cc per minute per gram of cupric chloride is employed.

Mixtures of ethylene and ethane can be employed as the feed material, however, very little vinyl chloride is actually obtained from the ethane. The ethylene or ethylene-ethane gas mixture may also be mixed with an inert gas diluent, such as nitrogen, or other gases which may enter into side reactions without substantially inhibiting the primary reaction.

The reaction may be controlled so that vinyl chloride or tetrachloroethylene may be obtained selectively and in good yield. Other products obtained in minor proportion include trans-dichloroethylene, cis-dichloroethylene, 1,2-dichloroethane, trichloroethylene, 1,1,2-trichloroethane and 1,1,2,2-tetrachloroethane. The major products are easily separated from the other chlorinated products by standard methods well known to the art, i.e., selective absorption, or conventional fractional distillation. The chlorinated ethanes and ethylenes can then by recycled for further reaction with a cupric chloride catalyst to produce significant amounts of tetrachloroethylene. Alternatively, the other chlorinated products can be cracked by conventional methods producing further amounts of vinyl chloride.

Thus, the process of the invention could be used to produce other chlorinated hydrocarbons, however, by careful control of the reaction conditions and/or by cracking or recycling the product stream, the process can be used to produce primarily vinyl chloride or tetrachloroethylene.

In this reaction, the cupric chloride is reduced to cuprous chloride. Cupric chloride can be regenerated by reacting the cuprous chloride with hydrogen chloride in the presence of an oxygen containing gas. This regeneration reaction can be accomplished at temperatures of from 250° to 550°C.

The present invention and certain specific embodiments are illustrated in detail in the following examples.

EXAMPLE 1

A chlorination catalyst is prepared by mixing 25 grams of anhydrous cupric chloride and 35 grams of silicon carbide having a particle size of between 4 and 6 mesh. The catalyst is placed in a Vycor tube reactor having a gas inlet at the top and a gas vent at the bottom. Ethylene was passed over the catalyst at various temperatures at a flow rate of 1cc per minute per gram of cupric chloride, at various temperatures. The products were analyzed by gas liquid chromatography and the results are summarized in Table 1.

TABLE 1

| Temperature. °C | 300° | 360° | 400° | 450° |
|---|---|---|---|---|
| Vinyl chloride | 0.175 | 2.99 | 4.73 | 0.372 |
| trans-Dichloroethylene | 0.084 | 2.63 | 5.95 | 0.89 |
| cis-Dichloroethylene | 0.229 | 0.52 | 9.03 | 1.41 |
| 1,2-Dichloroethane | 77.3 | 63.5 | 9.61 | 0.38 |
| Trichloroethylene | — | 1.93 | 11.1 | 5.60 |
| 1,1,2-Trichloroethane | 3.25 | 9.61 | 4.97 | 0.49 |
| Tetrachloroethylene | 0.079 | 2.08 | 12.59 | 84.20 |
| 1,1,2,2-tetrachloroethane | 0.551 | 5.48 | 8.02 | 1.35 |
| Ethylene conversion | 92.8% | 85.5% | 97.3% | 97.9% |

This Table shows the effect of temperature on the yield of product at the constant flow rate, and how the temperature can be controlled to favor formation of specific products.

EXAMPLE 2

A chlorination catalyst is prepared and placed in the reactor as in Example 1. The temperature is maintained at 500° C while gaseous ethylene is passed over the catalyst at various flow rates. The products are analyzed by gas-liquid chromatography and the results are presented in Table 2.

TABLE 2

Mole % of Products at 500°C at a Variable Flow Rate

| Flow, cc/min./g. of CuCl$_2$ | 0.52 | 5.6 | 13.6 | 19.2 | 29.0 |
|---|---|---|---|---|---|
| Vinyl chloride | Trace | 18.0 | 32.5 | 31.2 | 10.1 |
| trans-Dichloroethylene | 2.20 | 9.27 | 7.84 | 5.16 | 4.65 |
| cis-Dichloroethylene | 3.27 | 11.4 | 9.83 | 7.29 | 6.02 |
| 1,2-Dichloroethane | 2.28 | 7.63 | 18.8 | 22.1 | 50.3 |
| Trichloroethylene | 16.01 | 3.2 | 11.2 | 8.00 | 5.60 |
| 1,1,2-Trichloroethane | 2.97 | 3.58 | 7.31 | 3.46 | 8.85 |
| Tetrachloroethylene | 47.7 | 10.1 | 9.96 | 7.94 | 5.15 |
| 1,1,2,2,-Tetrachloroethane | 2.73 | 0.98 | 2.12 | 1.55 | 2.70 |
| Ethylene conversion | 100% | 87.5% | 70.6% | 65.5% | 75.0% |

These results indicate the wide variation in products obtainable according to the flow rate employed at a constant temperature of 500° C.

EXAMPLE 3

The reaction was carried out as in Example 2 except that the flow rate varied as shown in the Table, and the temperature was kept constant at 450° C. The analysis of products is as follows:

TABLE 3

Mole % of Products at 450°C at a Variable Flow Rate

| Flow, cc/Min./g. of CuCl$_2$ | 1.0 | 2.8 | 6.4 | 8.6 |
|---|---|---|---|---|
| Vinyl chloride | 0.369 | 17.6 | 16.7 | 14.7 |
| trans-Dichloroethylene | 0.89 | 8.49 | 4.16 | 4.23 |
| cis-Dichloroethylene | 1.46 | 11.4 | 8.37 | 7.66 |
| 1,2-Dichloroethane | 0.38 | 23.2 | 49.0 | 53.3 |
| Trichloroethylene | 5.60 | 11.3 | 3.96 | 2.88 |
| 1,1,2-Trichloroethane | 0.49 | 7.38 | 6.10 | 5.72 |
| Tetrachloroethylene | 84.20 | 10.58 | 4.69 | 3.32 |
| 1,1,2,2-Tetrachloroethane | 1.35 | 3.77 | 2.73 | 2.32 |
| Ethylene conversion | 97.9% | 78.9% | 58.4% | 61.0% |

EXAMPLE 4

The reaction was conducted as in Example 2, with the exception that the flow rate was varied as shown and the temperature was kept constant at 550° C.

TABLE 4

Mole % Products at 550°C at a Variable Flow Rate

| Flow, cc/min./g. of CuCl$_2$ | 4.4 | 17.8 | 23.8 | 42.8 |
|---|---|---|---|---|
| Vinyl chloride | 9.83 | 31.4 | 33.7 | 27.7 |
| trans-Dichloroethylene | 10.1 | 5.91 | 6.53 | 5.63 |
| cis-Dichloroethylene | 12.1 | 7.30 | 9.31 | 7.08 |
| 1,2-Dichloroethane | 23.6 | 24.6 | 22.0 | 34.5 |
| Trichloroethylene | 21.2 | 6.54 | 8.92 | 7.42 |
| 1,1,2-Trichloroethane | 8.88 | 4.51 | 5.20 | 3.08 |
| Tetrachloroethylene | 9.91 | 4.72 | 6.98 | 3.04 |
| 1,1,2,2-Tetrachloroethane | 0.27 | 0.64 | 1.05 | 0.48 |
| Ethylene conversion | 90.1% | 63.1% | 62.8% | 56.8% |

It is seen from the above, that by careful control of the reaction conditions, particularly temperature and flow rate, high selectivity and good yields of vinyl chloride and/or tetrachloroethylene can be realized.

The following are certain preferred embodiments of the invention and are presented by way of further illustration only.

EXAMPLE 5

A chlorination catalyst is prepared and placed in a reactor according to the method of Example 1. The temperature is maintained at 500° C and gaseous ethylene is passed over the catalyst at a flow rate of 13.6cc of ethylene per minute per gram of cupric chloride.

The products of the above reaction were analyzed by gas-liquid chromatography and it was found that there was a 70.6 percent of ethylene dechlorinated products. The analysis of products based on the amount of ethylene consumed was as follows:

| Product | Mole % based on Ethylene Consumed |
|---|---|
| vinyl chloride | 32.5% |
| trans-dichloroethylene | 7.84% |
| cis-dichloroethylene | 9.83% |
| 1,2-dichloroethane | 18.8% |
| trichloroethylene | 11.2% |

| | |
|---|---|
| 1,1,2-trichloroethane | 7.31% |
| tetrachloroethylene | 9.96% |
| 1,1,2,2-tetrachloroethane | 2.12% | thus a 32.5 percent yield of vinyl chloride is obtained.

The effluent from the reactor is conveyed to a standard separating apparatus where it is separated into three streams. A vinyl chloride stream is conveyed to storage. An ethylene stream is recycled to the chlorination reaction for further production of vinyl chloride. A third stream containing the other chlorinated hydrocarbons is conveyed to a standard cracking unit and cracked by ordinary methods known to the art to produce substantial additional amounts of vinyl chloride.

EXAMPLE 6

A catalyst is prepared and placed in a reactor according to the method of Example 1. The temperature is maintained at 550° C. A gaseous ethylene stream is passed over the catalyst at a flow rate of 23.8cc of ethylene per minute per gram of cupric chloride. There is a 62.8 percent conversion of ethylene to chlorinated products. Based on the amount of ethylene consumed at 33.7 percent yield of vinyl chloride is obtained.

The products of the chlorination reaction are separated as in Example 5. The vinyl chloride stream is conveyed to storage. The ethylene and chlorinated product stream are recycled to the chlorination reaction for further reaction with cupric chloride. The ethylene reacts with cupric chloride to produce further amounts of vinyl chloride and other chlorinated ethylenes and ethanes. The chlorinated products from the first reaction react with the cupric chloride to produce substantial amounts of tetrachloroethylene, which is separated from the other materials by standard fractional distillation techniques.

Thus by recycling the products this method can be used to produce additional amounts of vinyl chloride and tetrachloroethylene.

EXAMPLE 7

A chlorination catalyst is prepared and placed in a reactor according to the method of Example 1. The temperature is maintained at 450° C. Gaseous ethylene is passed over the catalyst at a flow rate of 1cc per minute per gram of cupric chloride. There is a 97.9 percent conversion of ethylene to chlorinated products. Based on the amount of ethylene consumed, an 84.2 percent yield of tetrachloroethylene is realized.

EXAMPLE 8

A gas consisting of equal amounts by volume of ethane and ethylene were passed over a cupric chloride catalyst in a reactor as in example 1 at 470° C at a flow rate of 1cc per minute per gram of catalyst. A 79 percent conversion of the gas mixture was obtained with the recovered gas being mainly ethane. The product has the following analysis:

| | Mole % |
|---|---|
| Vinyl chloride | 0.57% |
| Ethyl chloride | 3.68% |
| trans-Dichloroethylene | 4.97% |
| cis-Dichloroethylene | 6.30% |
| 1,2-Dichloroethane | 17.69% |
| 1,1,2-Trichloroethane | 3.80% |
| Trichloroethylene | 10.62% |
| Tetrachloroethylene | 40.99% |
| Tetrachloroethane | 4.93% |

Thus a yield of close to 41 percent of tetrachloroethylene was realized.

While there have been described and pointed out the fundamental novel features of the invention as applied to the preferred embodiments, it will be understood that various omissions, substitutions and changes in the form and details of the method illustrated may be made by those skilled in the art without departing from the spirit and scope of the invention. It is the invention, therefore, to be limited only by the following claims.

What is claimed is:

1. A process for the production of tetrachloroethylene comprising:
   a. passing a gas stream consisting essentially of ethylene over a composition consisting essentially of a mixture of cupric chloride and inert material; at a temperature in the range of from 400 to 525° C. and at a flow rate of less than 5 cc of gas stream per minute per gram of cupric chloride.

2. The process of claim 1 wherein said temperature is within the range of from 400° to 500°C.

3. The process of claim 1 wherein the temperature is in the range of from 425° to 475°C.

4. The process of claim 3 wherein the flow rate is about 1 cc of gas stream per minute per gram of cupric chloride.

5. The process according to claim 1 wherein the temperature is within the range of from 475° to 525°C and the flow rate of the gas stream is in the range of from 0.5 to 0.9 cc per minute per gram of cupric chloride.

6. The process according to claim 1 wherein the rate ratio of inert material to cupric chloride is from about 1:1 to about 3:1.

* * * * *